US009369195B2

(12) United States Patent
Behrens et al.

(10) Patent No.: US 9,369,195 B2
(45) Date of Patent: *Jun. 14, 2016

(54) SATELLITE HAVING A PLURALITY OF DIRECTIONAL ANTENNAS FOR TRANSMITTING AND/OR RECEIVING AIR-TRAFFIC CONTROL RADIO SIGNALS

(75) Inventors: Jorg Behrens, Bremen (DE); Klaus Werner, Schwulper (DE); Lars-Christian Hauer, Bremen (DE); Toni Delovski, Bremen (DE)

(73) Assignee: Deutsches Zentrum Fuer Lyft-Und Raumfahrt E.V., Cologne (DE)

( * ) Notice: Subject to any disclaimer, the term of this patent is extended or adjusted under 35 U.S.C. 154(b) by 44 days.

This patent is subject to a terminal disclaimer.

(21) Appl. No.: 14/004,431

(22) PCT Filed: Mar. 9, 2012

(86) PCT No.: PCT/EP2012/054117
§ 371 (c)(1),
(2), (4) Date: Sep. 11, 2013

(87) PCT Pub. No.: WO2012/123361
PCT Pub. Date: Sep. 20, 2012

(65) Prior Publication Data
US 2014/0004791 A1    Jan. 2, 2014

(30) Foreign Application Priority Data
Mar. 11, 2011  (DE) .......................... 10 2011 013 737

(51) Int. Cl.
*H04B 7/185* (2006.01)
*G08G 5/04* (2006.01)
*G01S 13/78* (2006.01)
*G01S 13/91* (2006.01)

(52) U.S. Cl.
CPC .............. *H04B 7/18506* (2013.01); *G08G 5/04* (2013.01); *H04B 7/18508* (2013.01); *G01S 13/781* (2013.01); *G01S 13/91* (2013.01)

(58) Field of Classification Search
USPC ............. 455/3.03, 12.1, 13.2, 98, 427, 404.1, 455/404.2, 456.1; 701/213; 244/158.1, 244/158.4, 158.6
See application file for complete search history.

(56) References Cited

U.S. PATENT DOCUMENTS

| 4,942,403 | A | * | 7/1990 | Yokoyama | 342/372 |
| 5,389,940 | A | * | 2/1995 | Sutherland | 343/765 |
| 5,956,644 | A | * | 9/1999 | Miller et al. | 455/453 |
| 6,073,014 | A | * | 6/2000 | Blanchard et al. | 455/428 |
| 6,577,848 | B1 | * | 6/2003 | Gregg et al. | 455/13.2 |

(Continued)

FOREIGN PATENT DOCUMENTS

| EP | 1 093 242 A1 | 4/2001 |
| EP | 2 058 956 A1 | 5/2009 |

*Primary Examiner* — Dominic Rego
(74) *Attorney, Agent, or Firm* — Whitham Curtis Christofferson & Cook, PC

(57) ABSTRACT

The invention comprises a satellite (1) having at least one transmitting and/or receiving unit (2), which has an antenna assembly (3) for transmitting and/or receiving air-traffic control radio signals (4), wherein the antenna assembly (3) has a plurality of directional antennas (6a to 6c), which each form a respective transmitting and/or receiving sector (7a to 7c, 22a to 22e) within a defined transmitting and/or receiving area (21) and are designed to transmit and/or receive air-traffic control radio signals (4) in the respective transmitting and/or receiving sector (7a to 7c, 22a to 22e) of the directional antenna.

8 Claims, 2 Drawing Sheets

(56) References Cited

U.S. PATENT DOCUMENTS

Figure 1:
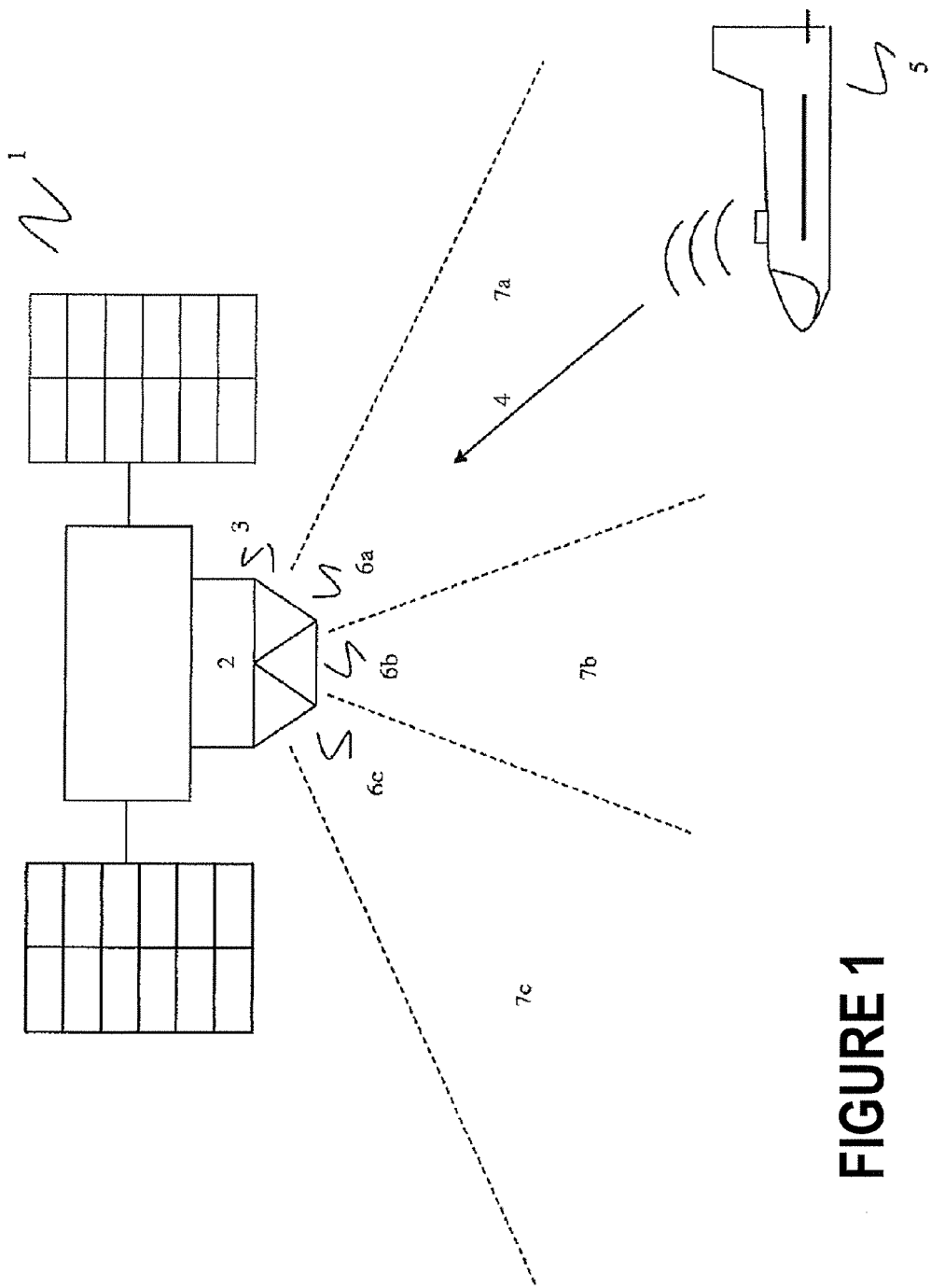

| | | |
|---|---|---|
| 8,867,025 B1* | 10/2014 | Smalls .......................... 356/28 |
| 2003/0203717 A1* | 10/2003 | Chuprun et al. ............. 455/12.1 |
| 2005/0024256 A1* | 2/2005 | Ridderheim et al. .......... 342/29 |
| 2006/0046639 A1* | 3/2006 | Walker et al. ............... 455/3.02 |
| 2006/0246911 A1* | 11/2006 | Petermann .................... 455/444 |
| 2007/0277221 A1* | 11/2007 | Davis et al. ................... 725/151 |
| 2010/0117893 A1 | 5/2010 | Dreher |
| 2010/0259458 A1* | 10/2010 | Mattis et al. .................. 343/766 |
| 2011/0015852 A1* | 1/2011 | Blomenhofer et al. ....... 701/120 |
| 2011/0169684 A1* | 7/2011 | Margolin ........................ 342/30 |

* cited by examiner

SATELLITE HAVING A PLURALITY OF DIRECTIONAL ANTENNAS FOR TRANSMITTING AND/OR RECEIVING AIR-TRAFFIC CONTROL RADIO SIGNALS

The invention relates to a satellite arrangement having at least one transmitting and/or receiving unit which has an antenna arrangement for transmitting and/or receiving air-traffic control radio signals. The invention also relates to a transmitting and/or receiving unit suitable for this purpose.

PRIOR ART

The monitoring and control of the air traffic which is constantly increasing worldwide is currently based primarily on two fundamental technologies: radar monitoring and voice-based VHF radio systems for Air Traffic Management (ATM). In the case of radar monitoring, radio signals are transmitted using special radar ground stations, said radio signals then either being reflected by the flying object on its outer surface and received once more by the ground station (primary radar) or causing the flying object autonomously to send back specific information to the ground station (secondary radar). However, in both cases it is necessary for the flying object to be located within a coverage area dependent on the range of the radar ground station, as no usable signals would otherwise be produced. Since radar ground stations of this type are very expensive to set up and, due to geographical conditions alone, cannot be installed all over the world, radar ground stations are currently found mainly in regions with heavy traffic or near the coast, in order to guarantee monitoring at least at traffic hubs. However, as a result, a worldwide, gapless radar monitoring of flying objects is not possible.

If a flying object is located outside the radar coverage, the corresponding monitoring and control stations responsible for the air-traffic control of the corresponding flying object maintain contact at regular intervals via the VHF radio system. However, the VHF radio system is based entirely on the principle of voice messages, so that it often occurs particularly in the case of long-haul flights that the corresponding monitoring and control station receives no information from the aircraft over a lengthy period because, for example, the autopilot is activated and the pilots are engaged in other activities.

The status of the flying object is therefore uncertain over a lengthy period since a continuous gapless monitoring is not provided.

Along with the aforementioned passive or secondary radar, ADS ("Automatic Dependent Surveillance") systems are known. In ADS systems, corresponding data are automatically and continuously collected on board the aircraft, including the current position, which can be determined, for example, using a satellite navigation system such as GPS or Galileo. Other flight data may, for example, be the flight number, aircraft type, speed, flight altitude and flight direction. If a corresponding radio signal transmitted from a ground station is received by the flying object, the flying object transmits these flight data using a corresponding ADS message to the ground station. The ground station receives the message and can display the flight data contained in the message to the air-traffic controllers or control stations. These systems, which transmit the messages on request, are also frequently referred to as ADS-C or ADS-A. For this purpose, the aircraft are equipped with so-called FANS-1/A devices, which enable a radio data link via VHF, RF or satellite radio and therefore also a monitoring of the aircraft in oceanic airspace. However, the position messages are transmitted at time intervals of around 15 minutes or more due to the low data rate, so that a continuous flight monitoring is not provided.

Along with the systems which transmit their flight data entirely on request, the ADS-B (Broadcast) system also exists, which autonomously transmits a corresponding ADS-B message at periodic, discrete-time intervals of around half a second. If the flying object is located in a region with dense traffic, an entire range of ground stations is normally located here, which can receive the automatically transmitted ADS messages. In addition, it is also possible for other flying objects which have a corresponding receiver to be able to receive ADS-B messages from other aircraft, in order thus to build up a picture of the traffic situation of the surrounding airspace depending on the flight data contained in the message.

Since the equipment of transport aircraft with mode-S transponders is currently prescribed as mandatory, the mode-S 1090ES data transmission system has become established as the de facto standard for the ADS-B system in general aviation. Mode-S 1090ES is based on the modulation methods and data formats defined for mode-S, wherein a fixed, worldwide unique 24-bit address is allocated to each aircraft. The downlink in mode-S is established at a frequency of 1090 MHz.

However, as with all systems based on radio location, the ADS-B systems have the decisive disadvantage that the aircraft must be located in the receiving area of a corresponding receiving unit so that the ADS-B messages transmitted by the aircraft can also be received by the corresponding supervisory control station. Due to the limited range of the ADS-B signals, a worldwide gapless monitoring using ground stations is not possible even with a system of this type since, on the one hand for cost reasons, and, on the other hand due to geographical conditions, ground stations cannot be set up all over the world for gapless coverage.

For this purpose, DE 10 2008 026 415 A1 and DE 10 2008 013 357 A1 propose that corresponding ADS-B receivers are arranged on a satellite which circles the Earth in a relatively low orbit and can therefore receive the ADS-B signals transmitted by the aircraft. The received ADS-B messages can then be forwarded to the control station via a direct link to a control station or via a corresponding relay satellite, where they can then be displayed accordingly to the air-traffic controller. A coverage with ADS-B receivers can thus be guaranteed in areas where no ground stations can essentially be set up.

The reason for the decisive disadvantage lies in the ADS-B system itself. Due to the pulse position modulation method used, in the case of a plurality of transmitters located in the receiving area of an individual receiver, signal interferences occur which in some instances can no longer be resolved by the individual receiver, so that it must reject the received signals. In pulse position modulation, the sequential bit sequence of the information to be transmitted is coded by transmitting a pulse sequence with an underlying timing pattern, wherein each pulse has a corresponding position in its time window depending on a coded one or zero. If two or more pulse sequences then arrive temporally superimposed in the receiver, the latter is no longer able to determine the positions of the received pulses in an error-free manner and therefore decode the transmitted information. This form of signal interference is also referred to as garbling.

However, if ADS-B receivers are arranged on satellites, they are generally able to receive ADS signals within a quite large receiving area. As a result, the probability of a plurality of transmitters being located within the receiving area of the one satellite receiver also increases, which ultimately has the result that the probability of superimpositions of the signals transmitted by the aircraft also rises. If the satellite in its orbit then also enters a region with heavy traffic or dense traffic, for example in conurbations or flight hubs, an interference-free reception of ADS signals of this type can no longer be guaranteed. However, with regard to air-traffic control, the resilience of systems of this type is a decisive criterion.

OBJECT

The object of the present invention is therefore to indicate an improved device with which interference-prone air-traffic control radio signals transmitted by aircraft can be reliably received using a receive satellite.

SOLUTION

The object is achieved according to the invention with the satellite of the aforementioned type in that the antenna arrangement has a plurality of directional antennas which in each case form a transmitting and/or receiving sector within a defined transmitting and/or receiving area, and are designed to transmit and receive air-traffic control radio signals in their respective transmitting and/or receiving sector.

It is therefore proposed according to the invention that the satellite has at least one transmitting and/or receiving unit which has an antenna arrangement with which air-traffic control radio signals can be received or transmitted. Thus, ADS-B radio signals, which are transmitted by aircraft at periodic intervals, can be received using the receiving unit and the antenna arrangement on the satellite. The included flight data can then be forwarded to a ground station or flight control station, in order to present them there to the air-traffic controllers. Furthermore, corresponding ADS-B radio signals can also be transmitted via the antenna arrangement with a corresponding transmitting unit arranged on the satellite, in order, for example, in the case of aircraft in the receiving area of the antenna arrangement, to transmit a radar image of the surrounding air space. An aircraft within the receiving area can therefore also receive current flight data of other aircraft.

The directional antennas have transmitters and receivers with associated decoders.

Receive satellites of this type which, due to the limited range of the air-traffic control radio signals, are located in a relatively low orbit (LEO: Low Earth Orbit), have a relatively high orbital velocity, so that they pass over regions with at least partially heavy traffic or dense traffic at short intervals. Due to the extensive receiving area produced by the arrangement of the receiving unit on a satellite and the pulse position modulation method in ADS-B air-traffic control radio signals, the significant problem arises, particularly in regions with heavy traffic or dense traffic, that the radio signals interfere with one another and therefore a reliable reception of the radio signals can no longer be guaranteed (garbling). Through superimposition of a plurality of radio signals, the information to be transmitted, resulting from the position of the individual pulses within a pulse sequence, becomes unusable for the receiver, since it can no longer identify the signal to which the pulse belongs and the position at which it is located.

To solve these problems, the present invention proposes that the antenna arrangement has a plurality of directional antennas, which in each case form a transmitting and/or receiving sector, wherein the sum of all transmitting and receiving sectors covers the entire transmitting and/or receiving area, which is ultimately defined by the orbit of the satellites. Within their respective transmitting and/or receiving sector, the directional antennas of the antenna arrangement are designed so that they predominantly receive the radio signals also transmitted by aircraft within this sector. A dedicated receiver with a decoder is associated with each directional antenna. Furthermore, the air-traffic control radio signals are transmitted by a transmitting unit via the directional antenna so that they are receivable by a flying object only within the respective transmitting sector of the directional antenna.

The probability of signal collisions is reduced through the division of the total receiving area into a plurality of sectors, so that a reliable reception via the satellite can be guaranteed even in the case of interference-prone ADS-B signals.

In order to be able to ensure a gapless reception at all times within the defined receiving area also, it is particularly advantageous that the directional antennas are arranged and aligned in such a way that adjacent transmitting and/or receiving sectors overlap one another at least in their peripheral areas. This ultimately prevents the formation of reception gaps, which is not acceptable, particularly with regard to guaranteeing air-traffic control.

Furthermore, it is quite particularly advantageous if the directional antennas are arranged in such a way that they overlap one another at least partially within the receiving area so that, if a transmitting and/or receiving sector enters a region with a heavy radio traffic load, at least one other transmitting and/or receiving sector which overlaps with the first transmitting and/or receiving sector has not yet entered this area. If a transmitting and/or receiving sector and the associated receiver with a decoder is overloaded due to a heavy radio traffic load, it can be ensured through the overlap with a further transmitting and/or receiving sector in such a way that the latter has not yet extended into the congested region that an interference-free reception remains possible at least in the area of the second transmitting and/or receiving sector. This substantially increases the resilience of the overall receiving unit.

The transmitting and/or receiving unit is advantageously configured in such a way that it can adapt the directional effect of the directional antennas. Thus, for example, depending on a predictable and/or current radio traffic load in at least one transmitting and/or receiving sector, the directional effect of the individual directional antennas can be adapted so that a reception which is as error-free and interference-free as possible and an interference-free transmission of air-traffic control radio signals can be achieved. Thus, the spatial extension of a transmitting and/or receiving sector can be adapted through adaptation of the directional effect to the current conditions in the same way as through a spatial position shift of the transmitting and/or receiving sector. It is thus conceivable, for example, for transmitting and/or receiving sectors of a transmitting and/or receiving area overloaded by radio signals to be adapted in their spatial extension or in their spatial orientation in such a way that fewer signal overlaps take place in the now reduced transmitting and receiving sectors.

It is therefore quite particularly advantageous if the transmitting and/or receiving unit is configured to adapt the directional effect of one or more directional antennas in such a way that the spatial extension and/or the spatial orientation of the transmitting and/or receiving sectors of the individual directional antennas can be adapted to a predicted or current radio traffic load, in particular that the transmitting and/or receiving sectors with the radio traffic load are reduced in their spatial extension.

Furthermore, the directional effect of one or more directional antennas can also be adapted depending on a frequency of a radio signal interference, depending on a traffic density in one or more sectors, or depending on the position of the satellite in its orbit. The receiving unit can thus, for example, at fixed satellite positions, essentially adapt the directional effect accordingly, since at specific orbital positions of the satellites, an increased traffic density is assumed, and therefore an increased radio traffic also. However, it is also conceivable for the transmitting and/or receiving units to detect corresponding radio interferences and, depending on the frequency of the detected radio interferences, adapt the directional effect of the directional antennas accordingly. Randomly occurring radio traffic loads located outside corresponding traffic hubs can therefore also be recognized and can accordingly be met with an adequate response.

Furthermore, it is conceivable and advantageous if the antenna arrangement has a pivoting device with which one or more directional antennas can be pivoted in relation to the satellite. Thus, the spatial orientation of the transmitting and/or receiving sectors of the respective directional antenna can be modified accordingly, in order, for example, to respond to an increased radio traffic load or to keep the directional effect of the directional antenna out of an area with dense traffic and therefore with a radio traffic load, in order thus to continue to guarantee radio traffic in the low-traffic regions. The overload of a directional antenna in an area with heavy traffic is non-critical if the monitoring is then guaranteed using alternative monitoring systems, such as, for example, ground radar.

Furthermore, it is quite particularly advantageous if the transmitting and/or receiving unit is configured to track the directional effect of one or more directional antennas. Due to the fact that the satellite moves at a relatively high speed in a low orbit, a relatively substantial change of location takes place in a short time. If the directional effect of one or more directional antennas has been adapted to the monitoring of a specific area and a corresponding radio traffic load, it is then particularly advantageous if this adaptation is tracked in the further movement of the satellite in its orbit, so that the optimum adaptation to the area to be monitored and its instantaneous or predicted radio traffic load always exists and continues to exist at all times.

Moreover, the object is also achieved according to the invention with a transmitting and/or receiving unit with fixing means for fixing to a satellite, and with an antenna arrangement which has a plurality of directional antennas, wherein the directional antennas in each case form a transmitting and/or receiving sector within a defined receiving area and are designed to transmit and/or receive air-traffic control radio signals in their respective transmitting and/or receiving sector.

Figure 2:
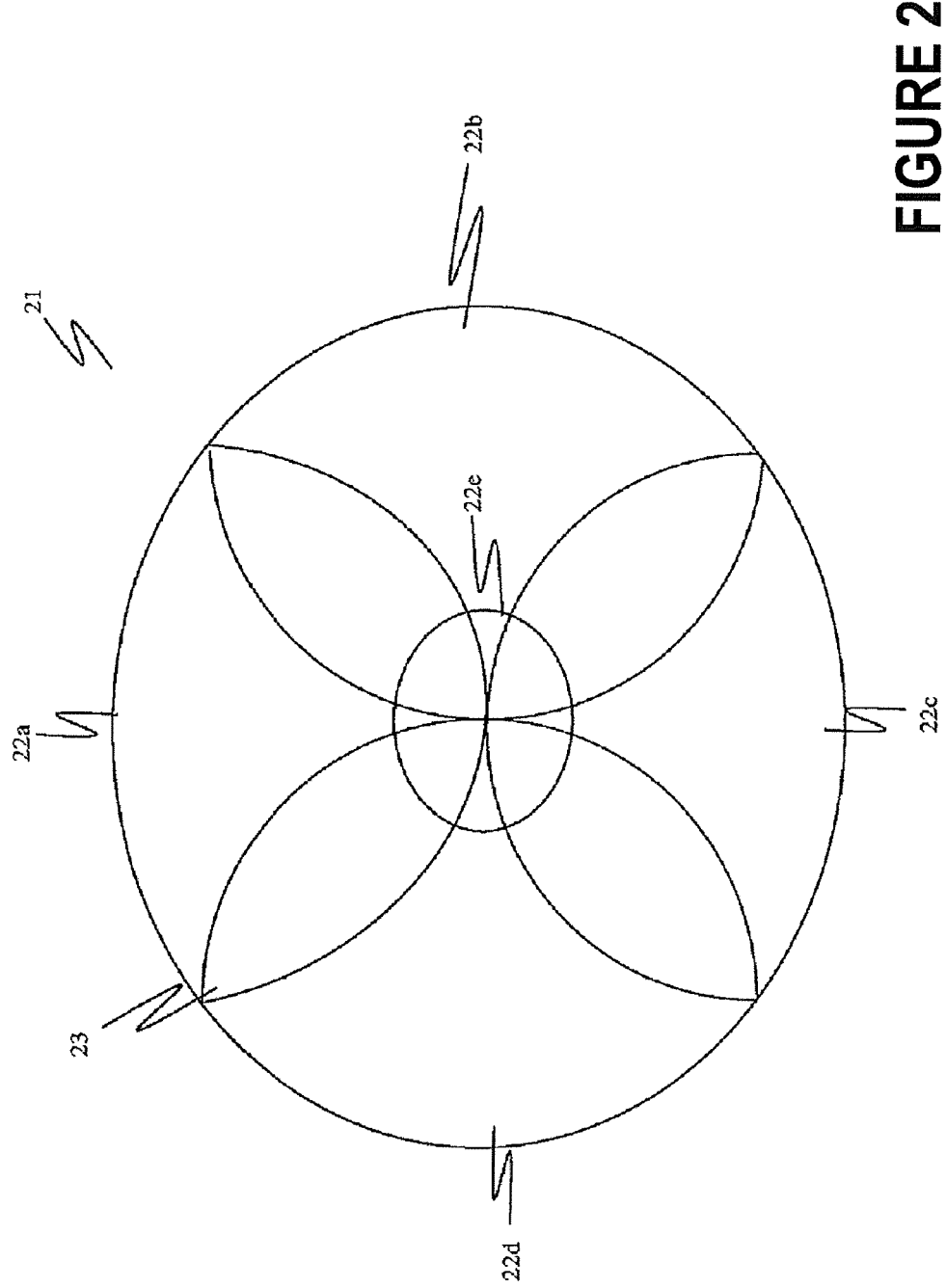

The invention will be explained in detail by way of example with reference to the attached drawings, in which:

FIG. 1—shows a schematic representation of a monitoring system with a satellite according to the invention;

FIG. 2—shows the receiving area of a receiving unit with a plurality of sector-by-sector directional receive antennas.

FIG. 1 shows a monitoring system for flying objects with the satellite 1 according to the invention. The satellite 1, which is preferably located in a low orbit (LEO), has a transmitting and/or receiving unit 2, which is configured via an antenna arrangement 3 to receive ADS-B signals 4. ADS-B signals 4 of this type are periodically transmitted by aircraft 5 in order to forward corresponding flight data of the corresponding flying objects 5 to a control station (not shown). These flight data contained in the ADS-B signals 4 can then also be received and forwarded via a satellite and its communication system.

According to the invention, the antenna arrangement 3 of the transmitting and/or receiving unit 2 has a plurality of directional antennas 6a, 6b and 6c, which are designed to transmit and/or receive ADS-B signals within a defined receiving area in their respective formed transmitting and/or receiving sector 7a, 7b or 7c. ADS-B signals 4 which, in conjunction with other transmitters, are quite interference-prone, can thus be received only in the transmitting and receiving sector 7a in which the corresponding transmitter, i.e. the flying object 5, is ultimately also located. Conversely, no signals are received in the other transmitting and/or receiving sectors 7b and 7c, so that these sectors are available for other transmitters, so that a plurality of flying objects can be monitored within the defined receiving area, which is ultimately formed by the sum of the individual sectors 7a to 7c, without interference.

The directional antennas are then advantageously designed so that their directional effect can be adapted to the predicted or actual radio traffic load. If, for example, a plurality of aircraft 5 are located within the transmitting and/or receiving sector 7a, an overload of the receiver with a decoder associated with the directional antenna 6a occurs in this transmitting and/or receiving sector 7a, since so many transmitters which can mutually interfere with one another (garbling) transmit radio signals here, so that a reliable reception of the flight data is no longer possible.

Due to the reduction of the transmitting and/or receiving sector 7a, it can be achieved, on the one hand, that some of the transmitters now move into a following transmitting and/or receiving sector, for example 7b, since this transmitting and/or receiving sector 7b is adapted to the reduction of the adjacent transmitting and/or receiving sector 7a. The transmitters which were all previously located in one sector are thus divided among two or more sectors. As a result of a reduction of the overloaded transmitting and/or receiving sector 7a and a corresponding increase and adaptation of the remaining sectors so that the entire receiving area is covered in a gapless manner by the sectors, a substantially larger area of the defined receiving area can also continue to be monitored without interference, since the load now relates to a small area. An overload of a relatively small transmitting and/or receiving sector is non-critical if further secondary monitoring facilities, such as, for example, ground stations, exist. This is usually the case if the satellite in its orbit passes over traffic hubs.

Since both the flying object 5 and the satellite 1 move at quite high speeds relative to one another, it is furthermore advantageous if the directional effect adapted to the instantaneous or predicted radio traffic load is tracked, so that, despite the relative movement of the two objects 5 and 1 in relation to one another, the directional effect is at all times adapted in an optimum manner to the situation. Not only the spatial extension of a transmitting and receiving sector is changed, but also its orientation within the receiving area.

FIG. 2 shows a defined transmitting and/or receiving area 21 from the perspective of the satellite in the direction of the Earth's surface. The directional antennas arranged on the satellite in each case form a transmitting and/or receiving sector 22a to 22e, wherein the directional antennas are configured so that the transmitting and/or receiving sectors 22a to 22e overlap one another at least partly in overlap areas 23 in order thus to guarantee a gapless reception or a gapless transmission within the defined transmitting and/or receiving area 21.

If, as already mentioned above, a radio traffic overload occurs, for example in the transmitting and/or receiving sector 22a, this transmitting and/or receiving sector can be reduced in its spatial extension in order thus either to divide other transmitters and receivers among other sectors or reduce the overloaded area in order to achieve a larger, interference-free coverage within the defined transmitting and/or receiving area 21.

Furthermore, it is particularly advantageous if the orientation of the centrally arranged transmitting and/or receiving sector 22e is changed so that it extends completely into the upper transmitting and/or receiving sector 22a. Due to this complete overlap, it can be achieved that aircraft located within the transmitting and/or receiving sector 22a and located in the overlapping transmitting and/or receiving sector 22e are not affected by an interference of the transmitting and/or receiving sector 22a. The resilience can thus be substantially increased here also.

The invention claimed is:

1. A satellite having at least one transmitting and/or receiving unit, which has an antenna arrangement for transmitting and/or receiving air-traffic control radio signals, wherein the antenna arrangement has a plurality of directional antennas which in each case form a transmitting and/or receiving sector within a defined transmitting and/or receiving area, and are designed to transmit and/or receive air-traffic control radio signals in their respective transmitting and/or receiving sector, wherein the satellite is configured according to one or more of:
(i) wherein the directional antennas are configured for the overlapping of the transmitting and/or receiving sectors in such a way that, if at least one transmitting and/or receiving sector enters a region with a traffic load due to air-traffic control radio signals, at least one transmitting and/or receiving sector overlapping with this sector does not yet extend into the traffic-loaded region, and
(ii) wherein the transmitting and/or receiving unit is configured to adapt the directional effect of one or more directional antennas in such a way that spatial extension and/or orientation of transmitting and/or receiving sectors with a predicted and/or current radio traffic load which is higher compared with that of other transmitting and/or receiving sectors is reduced and/or shifted.

2. The satellite as claimed in claim 1, wherein the directional antennas are configured so that adjacent transmitting and/or receiving sectors in each case overlap one another.

3. The satellite of claim 2 wherein the overlap includes a peripheral area.

4. The satellite as claimed in claim 1 wherein the transmitting and/or receiving unit is configured to adapt the directional effect of one or more directional antennas depending on a predicted and/or current radio traffic load due to air-traffic control radio signals in at least one transmitting and/or receiving sector.

5. The satellite as claimed in claim 1, wherein the transmitting and/or receiving unit is configured to adapt the directional effect of one or more directional antennas depending on a frequency of a radio signal interference in at least one transmitting and/or receiving sector, a traffic density in at least one transmitting and/or receiving sector and/or a position of the satellite in its orbit.

6. The satellite as claimed in claim 1, wherein this antenna arrangement has a pivoting device which is configured to pivot one or more directional antennas in relation to the satellite.

7. The satellite as claimed in claim 1, wherein the transmitting and/or receiving unit is configured to track the directional effect of one or more directional antennas.

8. A transmitting and/or receiving unit configured according to claim 1, with fixing means for fixing to a satellite and an antenna arrangement which has a plurality of directional antennas, wherein the directional antennas in each case form a transmitting and/or receiving sector within a defined transmitting and/or receiving area and are designed to transmit and/or receive air-traffic control radio signals in their respective transmitting and/or receiving sector.

* * * * *